US012636773B2

(12) United States Patent
　　 Aoki

(10) Patent No.: US 12,636,773 B2
(45) Date of Patent: May 26, 2026

(54) ROBOT AND ROBOT SYSTEM

(71) Applicant: SEIKO EPSON CORPORATION, Tokyo (JP)

(72) Inventor: Tetsuya Aoki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/093,020

(22) Filed: Mar. 27, 2025

(65) Prior Publication Data

US 2025/0303551 A1　　Oct. 2, 2025

(30) Foreign Application Priority Data

Mar. 28, 2024　　(JP) ................................. 2024-055116

(51) Int. Cl.
　　 *B25J 9/04*　　　　(2006.01)
　　 *B25J 9/10*　　　　(2006.01)
(52) U.S. Cl.
　　 CPC ............... *B25J 9/044* (2013.01); *B25J 9/104* (2013.01)
(58) Field of Classification Search
　　 CPC ............. B25J 9/043; B25J 9/104; B25J 9/044
　　 See application file for complete search history.

(56) References Cited

U.S. PATENT DOCUMENTS 5,271,292 A * 12/1993 Sawada .................... B25J 9/044
　　　　　　　　　　　　　　　　　　　　　　474/69
2015/0190933 A1 　 7/2015 Kremerman

FOREIGN PATENT DOCUMENTS

CN　　　111941411 A * 11/2020 .............. B25J 9/126
JP　　　2013006238 A　　 1/2013

OTHER PUBLICATIONS

The EESR for counterpart application No. EP25166154.2 mailed Jul. 30, 2025.

* cited by examiner

*Primary Examiner* — Gregory Robert Weber
(74) *Attorney, Agent, or Firm* — The Sun IP Law

(57)　　　　　ABSTRACT

A robot has a first pulley that is fixed to a rotation shaft of a motor, a second pulley that is fixed to a spline nut, an intermediate pulley that is supported by a support member and that rotates around a fourth rotation axis with respect to the second arm, a first belt that is wound around the first pulley and the intermediate pulley, and a second belt that is wound around the intermediate pulley and the second pulley, the intermediate pulley has a first intermediate pulley around which the first belt is wound, a second intermediate pulley around which the second belt is wound, and a shaft portion that couples the first intermediate pulley and the second intermediate pulley, the first intermediate pulley has a recess portion that is open to a surface on a second intermediate pulley side and into which the shaft portion is inserted.

10 Claims, 10 Drawing Sheets

FIG. 4

ROBOT AND ROBOT SYSTEM

CROSS-REFERENCE TO RELATED APPLICATIONS

The present application is based on, and claims priority from JP Application Serial Number 2024-055116, filed Mar. 28, 2024, the disclosure of which is hereby incorporated by reference herein in its entirety.

BACKGROUND OF THE INVENTION

1. Technical Field

The present disclosure relates to a robot and a robot system.

2. Related Art

A robot described in JP-A-2013-006238 is a horizontal articulated robot (SCARA robot) and has a base, a first arm portion that is joined rotatably around a first rotation axis along a vertical direction with respect to a base, a second arm portion that is joined rotatably around a second rotation axis along the vertical direction with respect to the first arm portion, and a work head that is disposed at the second arm portion. In addition, the work head has a first bearing and a second bearing that are disposed coaxially side by side in the vertical direction and a vertically rotating shaft that is inserted through the first bearing and the second bearing. In such a work head, when the first bearing is rotated, the vertically rotating shaft rotates around a third rotation axis, which is a central axis thereof and which is along a vertical direction, and when the second bearing is rotated, the vertically rotating shaft linearly moves along the third rotation axis.

In addition, the robot has a first bearing rotation mechanism that rotates the first bearing to rotate the vertically rotating shaft around the third rotation axis. The first bearing rotation mechanism has a third motor and a deceleration mechanism that transmits rotation of the third motor to the first bearing. In addition, the deceleration mechanism has a second pulley that is fixed to a rotation shaft of the third motor, a first pulley that is fixed to the first bearing, an intermediate pulley that is positioned between the first and second pulleys, that includes a large-diameter pulley and a small-diameter pulley, which are arranged in the vertical direction, and that rotates around a fourth rotation axis along the vertical direction, a front stage belt for rotation that is wound around the second pulley and the large-diameter pulley, and a rear stage belt for rotation that is wound around the small-diameter pulley and the first pulley.

In such a configuration, the rotation of the third motor is transmitted to the large-diameter pulley via the second pulley and the front stage belt for rotation, and the large-diameter pulley and the small-diameter pulley rotate integrally around the fourth rotation axis. The rotation of the small-diameter pulley is transmitted to the first pulley via the rear stage belt for rotation, and the first pulley and the first bearing integrally rotate around the third rotation axis.

However, in JP-A-2013-006238, the intermediate pulley is likely to be increased in size since the intermediate pulley includes the large-diameter pulley and the small-diameter pulley arranged in the vertical direction, and it is difficult to say that the intermediate pulley is reduced in size.

SUMMARY OF THE INVENTION

According to an aspect of the present disclosure, there is provided a robot including:

a base;

a first arm that is joined to the base and that rotates around a first rotation axis with respect to the base;

a second arm that is joined to the first arm and that rotates around a second rotation axis, which is parallel to the first rotation axis, with respect to the first arm;

a work head that includes a spline shaft which is disposed at the second arm and which is disposed along a third rotation axis parallel to the first rotation axis and a spline nut which is mounted on the spline shaft, and in which the spline shaft rotates around the third rotation axis when the spline nut is rotated; and a spline shaft first drive mechanism that rotates the spline nut to rotate the spline shaft around the third rotation axis, in which the spline shaft first drive mechanism includes a motor and a power transmission mechanism that transmits rotation of the motor to the spline nut, the power transmission mechanism has a first pulley that is fixed to a rotation shaft of the motor, a second pulley that is fixed to the spline nut, an intermediate pulley that is supported by a support member via a bearing and that rotates around a fourth rotation axis, which is parallel to the first rotation axis, with respect to the second arm, a first belt that is wound around the first pulley and the intermediate pulley, and a second belt that is wound around the intermediate pulley and the second pulley, the intermediate pulley has a first intermediate pulley around which the first belt is wound, a second intermediate pulley that is disposed side by side with the first intermediate pulley in a direction along the fourth rotation axis and around which the second belt is wound, and a shaft portion that is disposed along the fourth rotation axis and that couples the first intermediate pulley and the second intermediate pulley, and is supported by the support member via the bearing at the shaft portion, one of the first intermediate pulley and the second intermediate pulley has a recess portion that is open to another side and into which the shaft portion is inserted, at least a part of the bearing is positioned in the recess portion, and in plan view from a direction orthogonal to the fourth rotation axis, the bearing and the first belt or the second belt overlap each other.

According to another aspect of the present disclosure, there is provided a robot system including:

a robot; and a control device that controls driving of the robot, in which the robot includes a base, a first arm that is joined to the base and that rotates around a first rotation axis with respect to the base, a second arm that is joined to the first arm and that rotates around a second rotation axis, which is parallel to the first rotation axis, with respect to the first arm, a work head that includes a spline shaft which is disposed at the second arm and which is disposed along a third rotation axis parallel to the first rotation axis and a spline nut which is mounted on the spline shaft, and in which the spline shaft rotates around the third rotation axis when the spline nut is rotated, and a spline shaft first drive mechanism that rotates the spline nut to rotate the spline shaft around the third rotation axis, the spline shaft first drive mechanism includes a motor and a power transmission mechanism that transmits rotation of the motor to the spline nut, the power transmission mechanism has a first pulley that is fixed to a rotation shaft of the motor, a second pulley that is fixed to the spline nut, an intermediate pulley that is supported by a support member via a bearing and that rotates around a fourth rotation axis, which is parallel to the first rotation axis, with respect to the second arm, a first belt that is wound around the first pulley and the intermediate pulley, and a second belt that is wound around the intermediate pulley and the second pulley, the intermediate pulley has a first intermediate pulley around which the first belt is wound, a second intermediate pulley that is disposed side by side with the first intermediate pulley in a direction along the fourth rotation axis and around which the second belt is wound, and a shaft portion that is disposed along the fourth rotation axis and that couples the first intermediate pulley and the second intermediate pulley, and is supported by the support member via the bearing at the shaft portion, one of the first intermediate pulley and the second intermediate pulley has a recess portion that is open to another side and into which the shaft portion is inserted, at least a part of the bearing is positioned in the recess portion, and in plan view from a direction orthogonal to the fourth rotation axis, the bearing and the first belt or the second belt overlap each other.

BRIEF DESCRIPTION OF DRAWINGS

Figure 4:
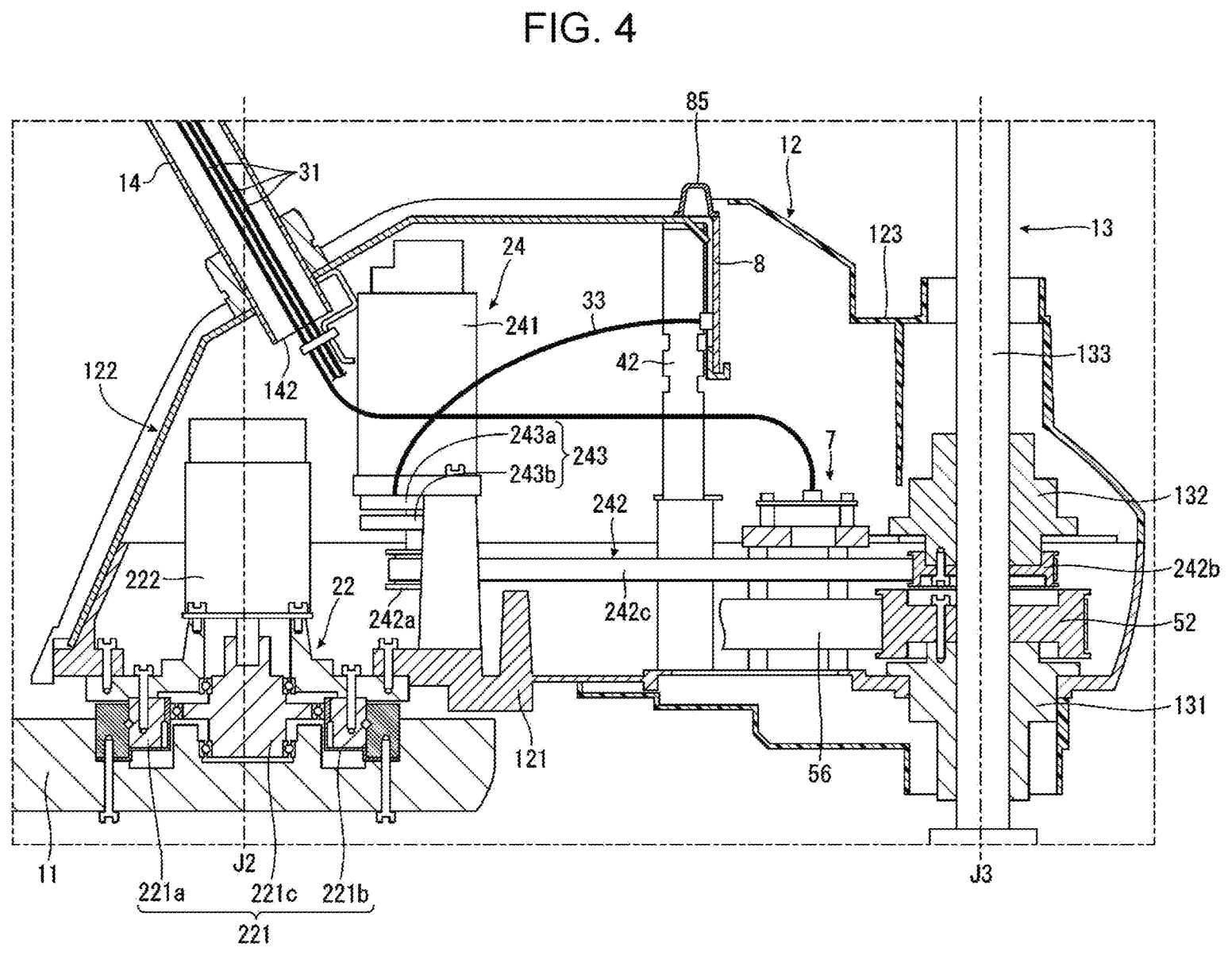

FIG. 4 is a cross-sectional view of the second arm viewed from the other side in the horizontal direction.

DETAILED DESCRIPTION OF THE INVENTION

Hereinafter, a robot and a robot system of the present disclosure will be described in detail based on an embodiment illustrated in the accompanying drawings.

Figure 1:
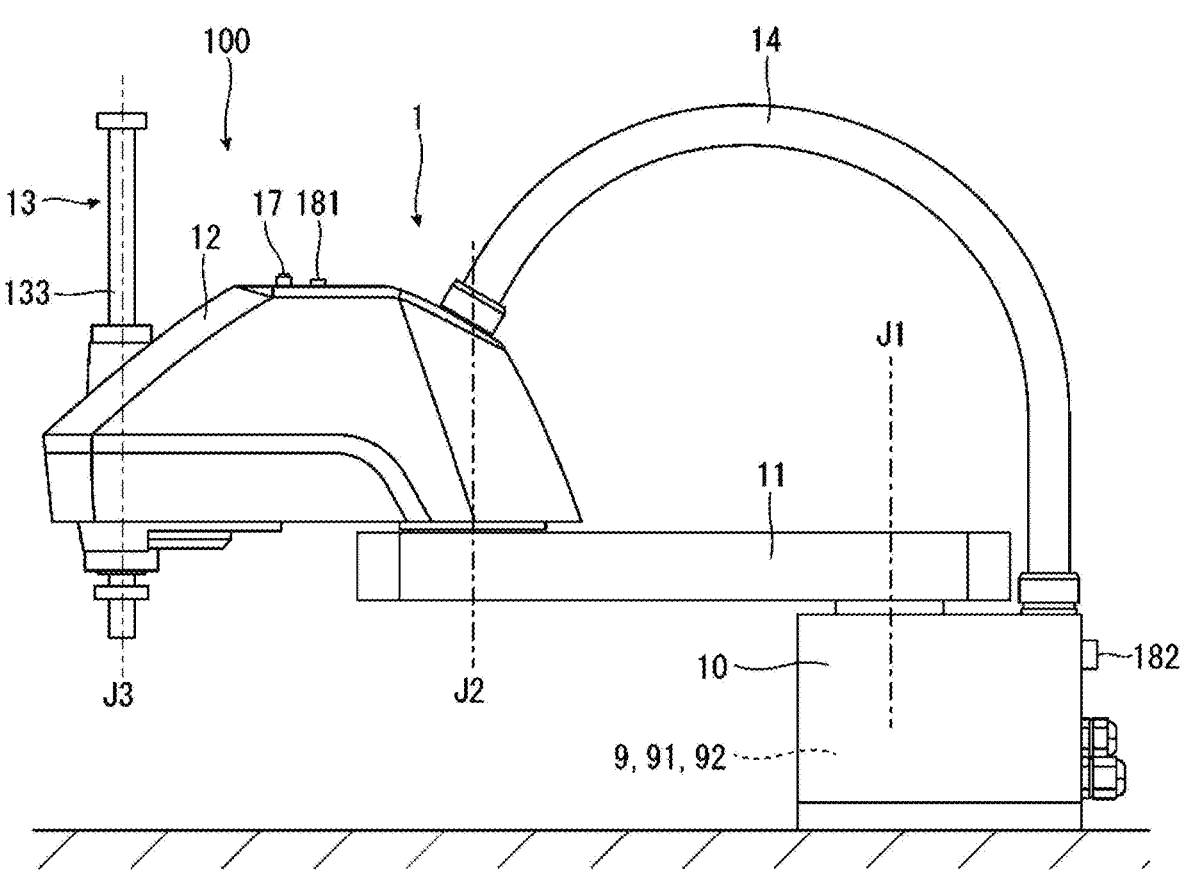
FIG. 1 is a side view illustrating a robot according to a first embodiment.
Figure 2:
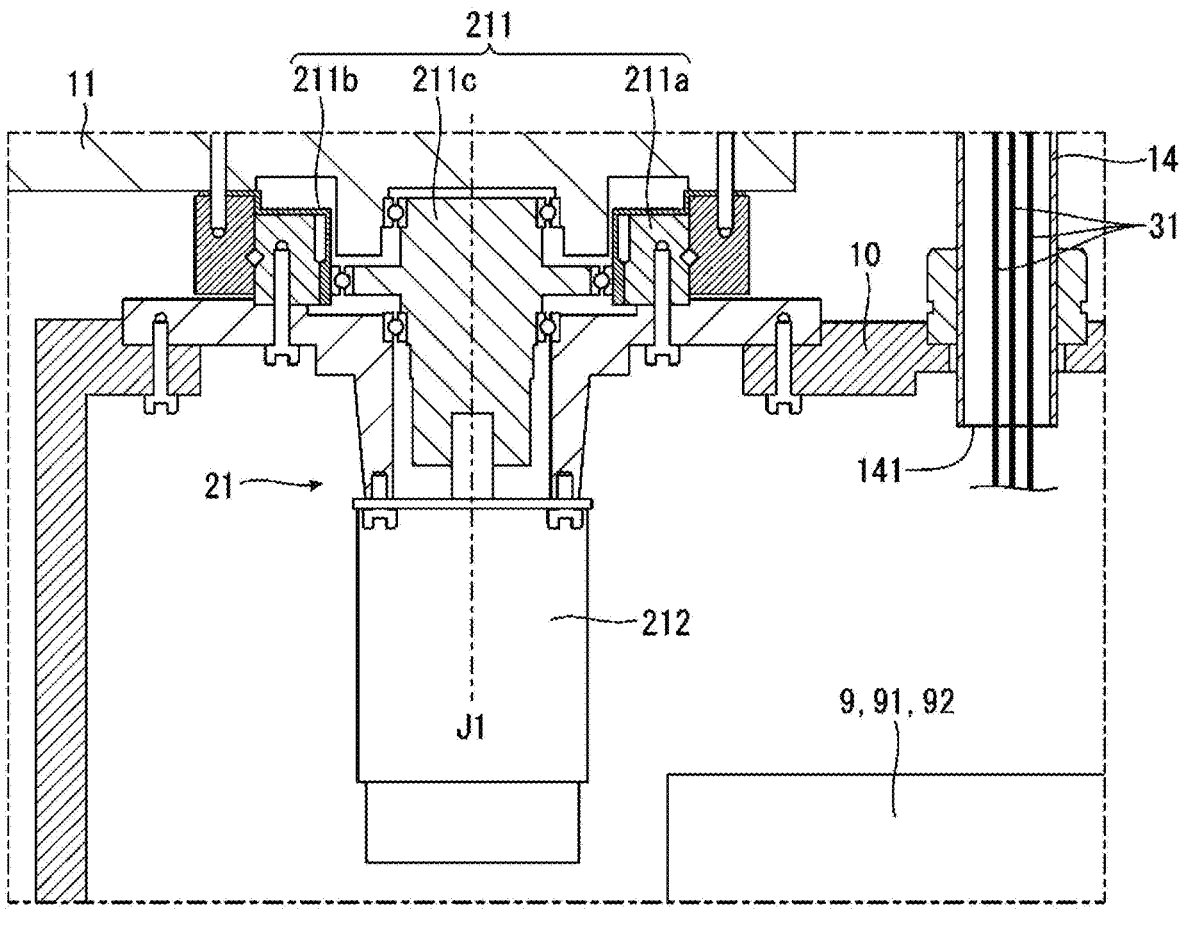
FIG. 2 is a cross-sectional view illustrating a joined portion between a base and a first arm.
Figure 3:
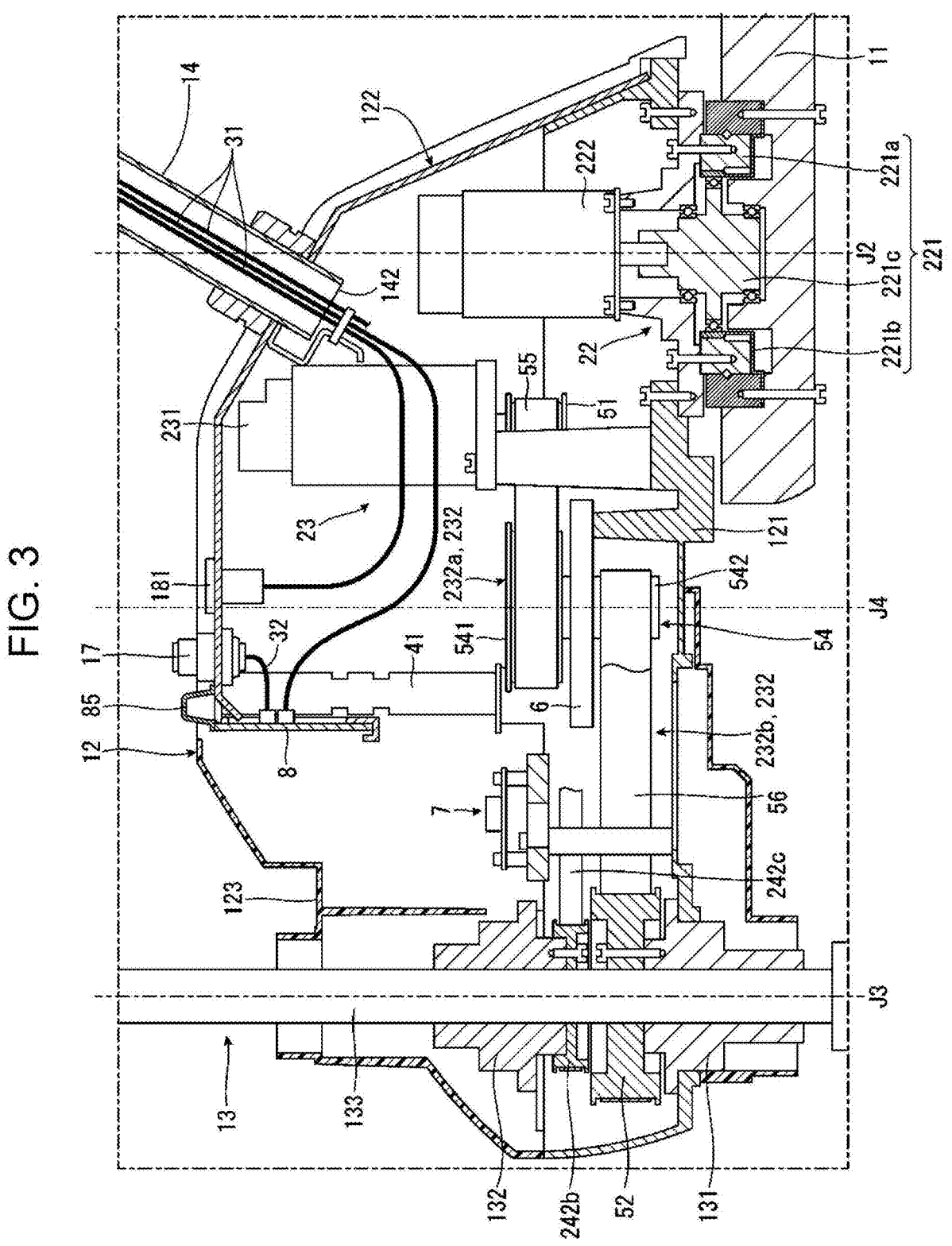
FIG. 3 is a cross-sectional view of a second arm viewed from one side in a horizontal direction.
Figure 5:
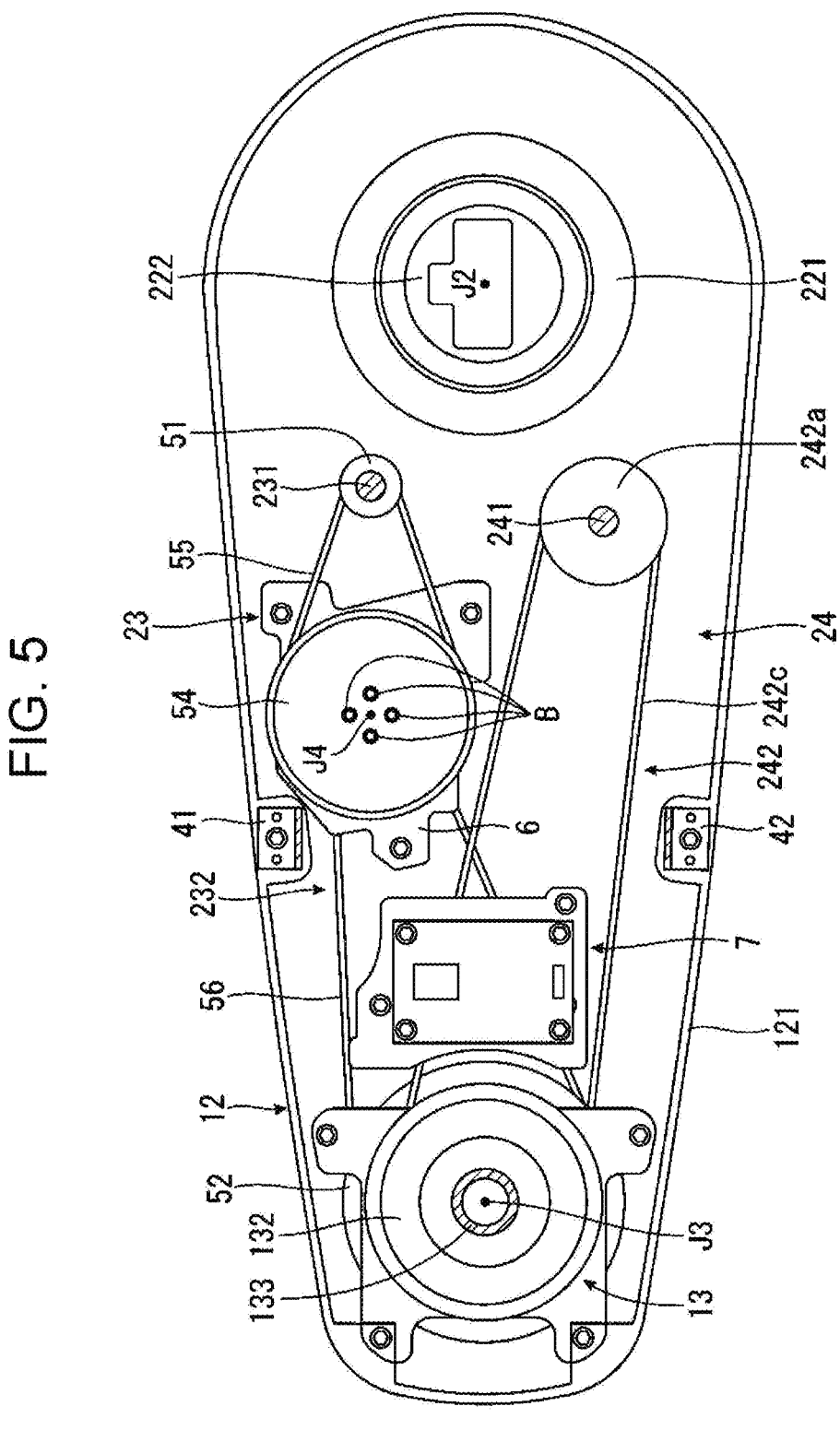
FIG. 5 is a top view illustrating an inside of the second arm.
Figure 6:
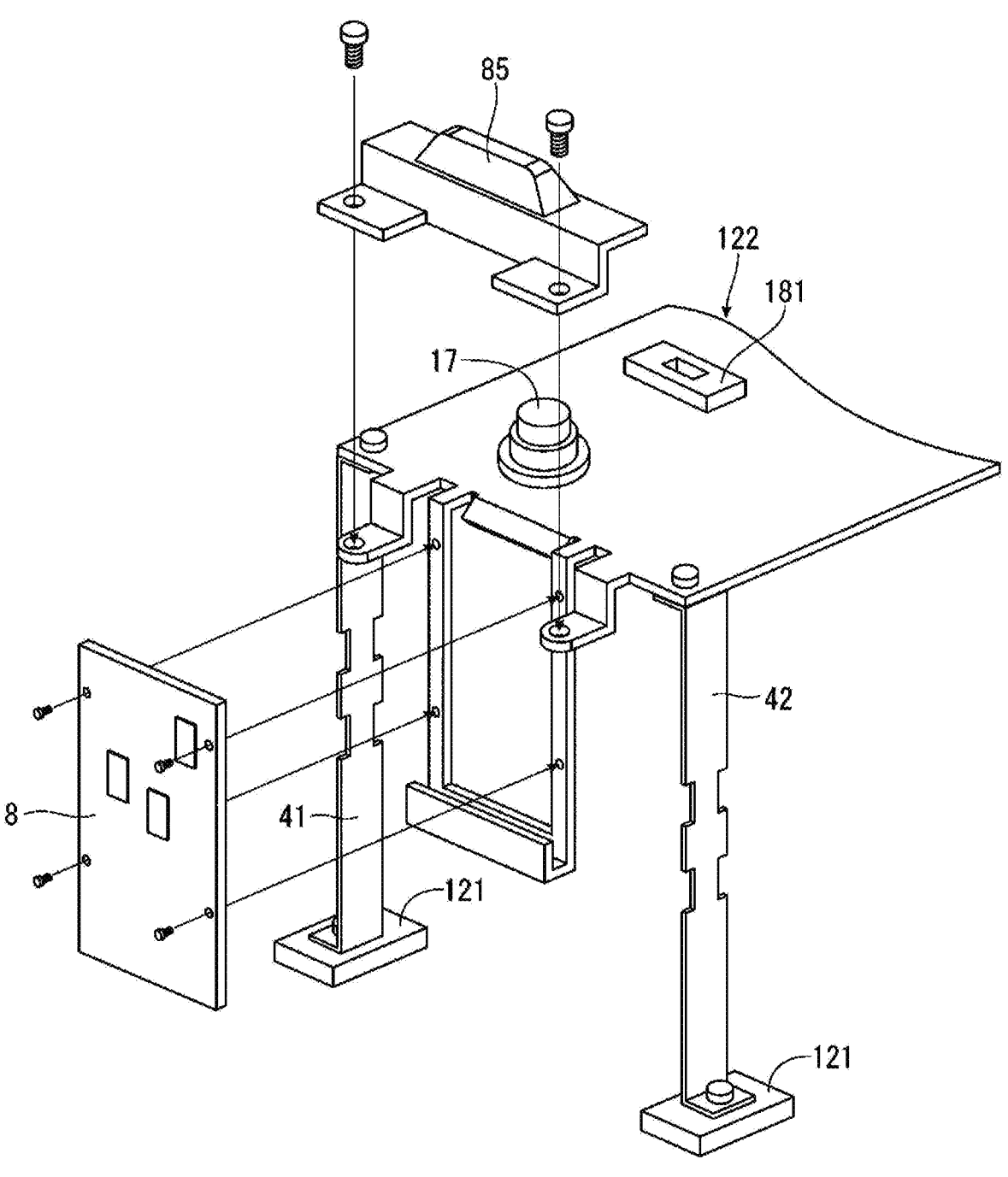
FIG. 6 is a perspective view illustrating a distal end portion of a frame.
Figure 7:
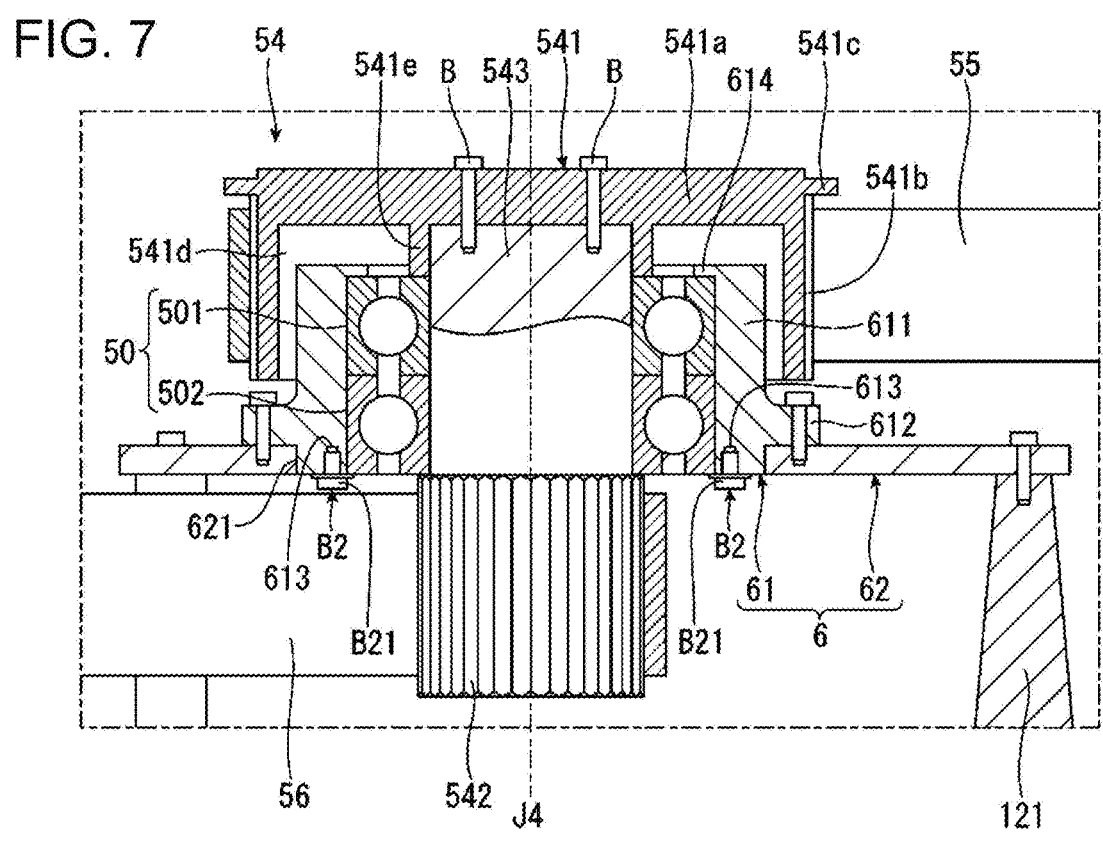
FIG. 7 is a cross-sectional view illustrating an enlarged intermediate pulley.
Figure 8:
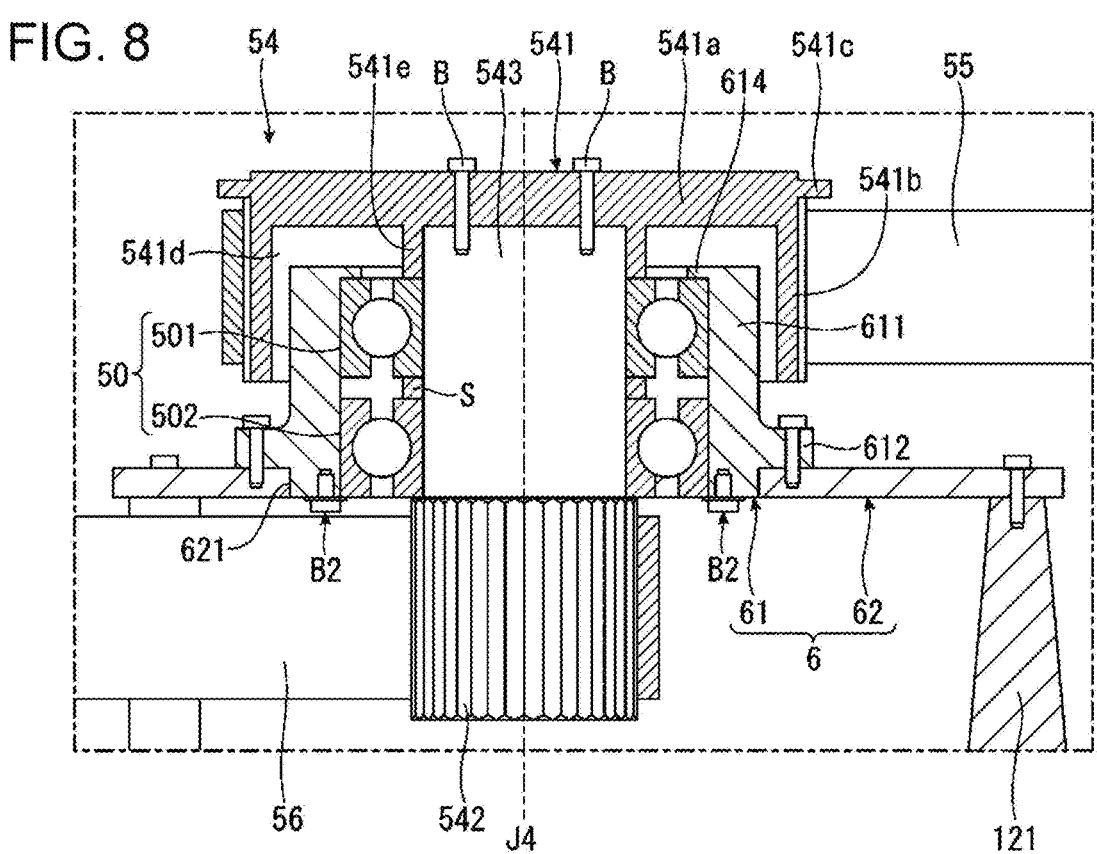
FIG. 8 is a cross-sectional view illustrating a modification example of the intermediate pulley illustrated in FIG. 7.
Figure 9:
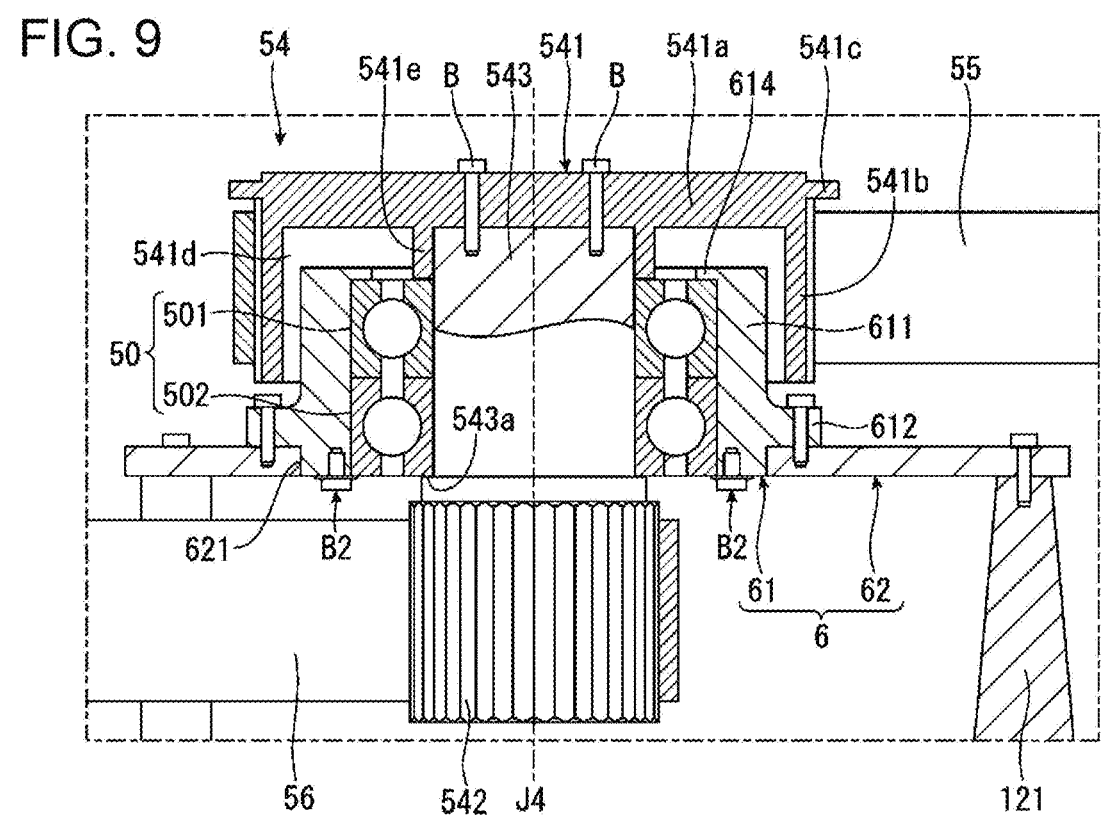
FIG. 9 is a cross-sectional view illustrating another modification example of the intermediate pulley illustrated in FIG. 7.
Figure 10:
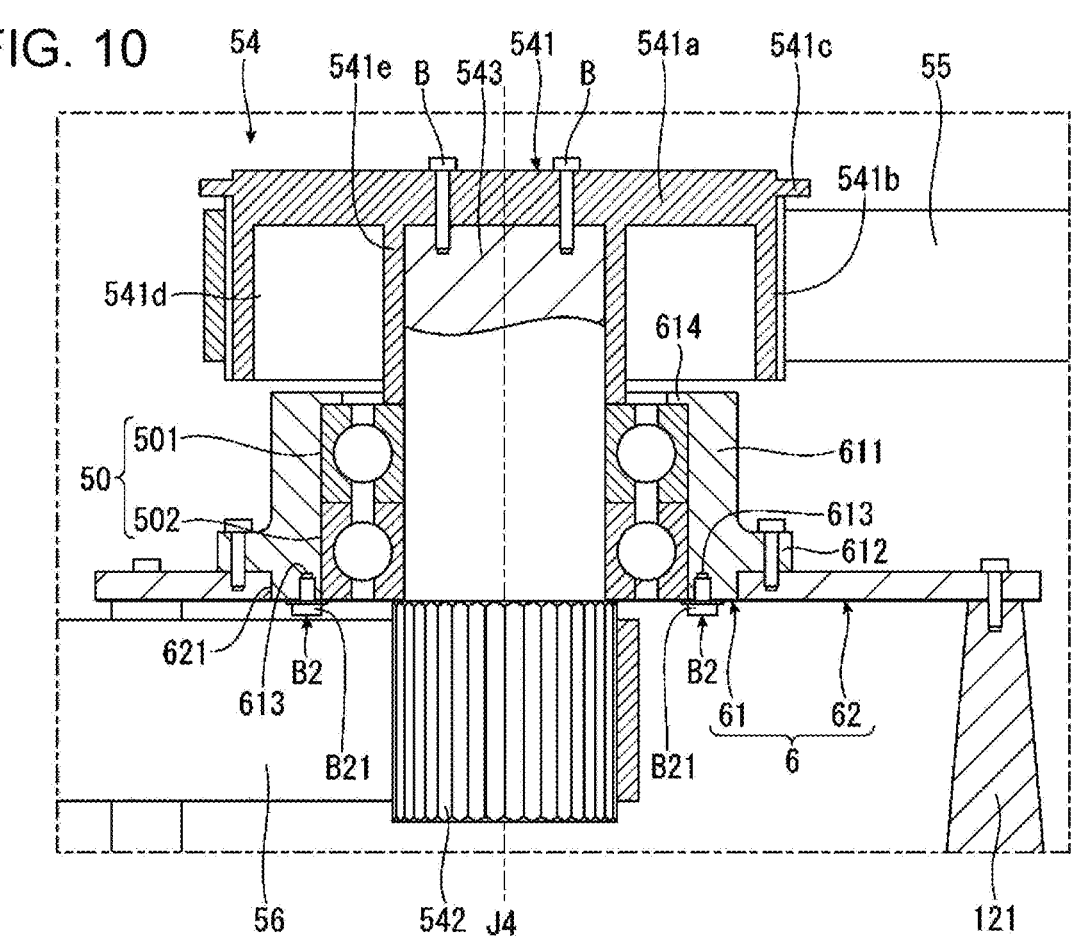
FIG. 10 is a cross-sectional view illustrating an intermediate pulley that is a comparative example in which a first bearing and a first belt do not overlap each other.
Figure 11:
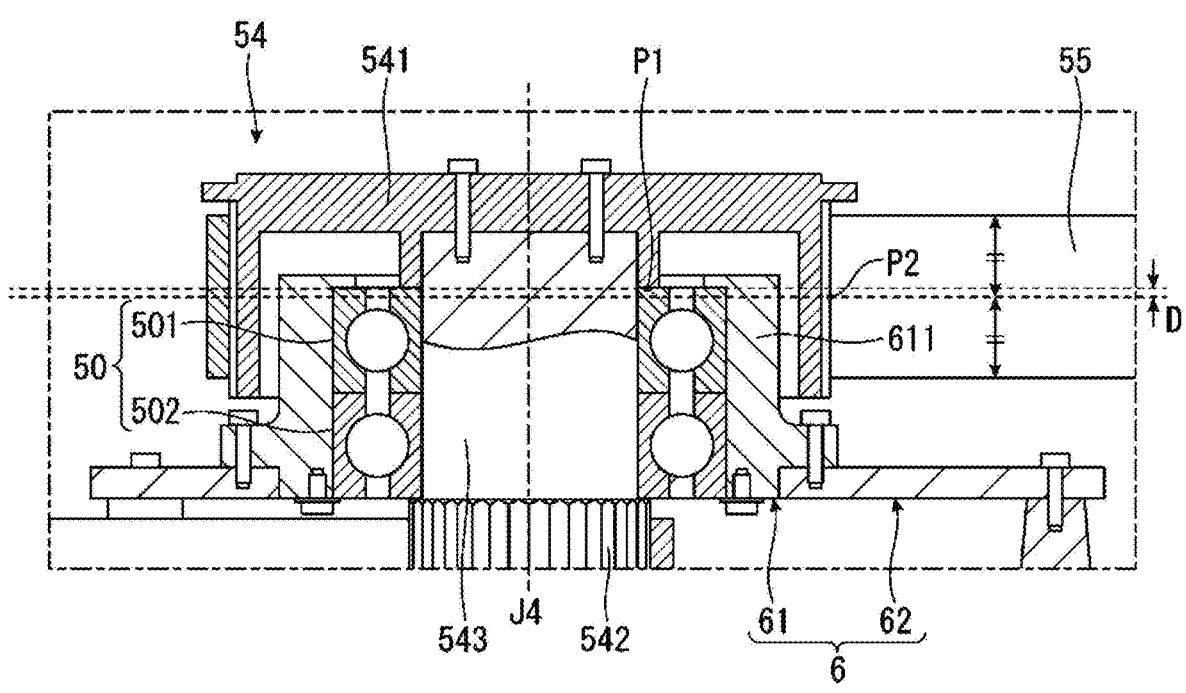
FIG. 11 is a cross-sectional view illustrating a positional relationship between a fixed position and a belt tension force point.
Figure 12:
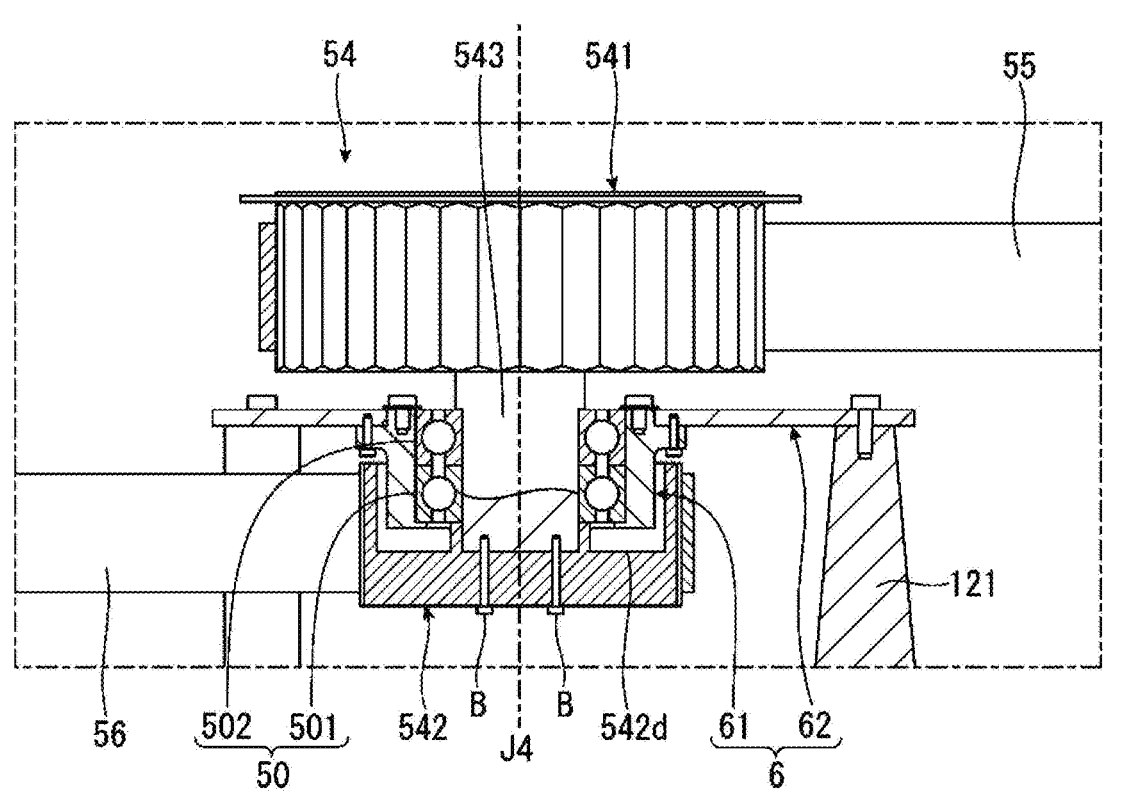
FIG. 12 is a cross-sectional view illustrating still another modification example of the intermediate pulley illustrated in FIG. 7.
Figure 13:
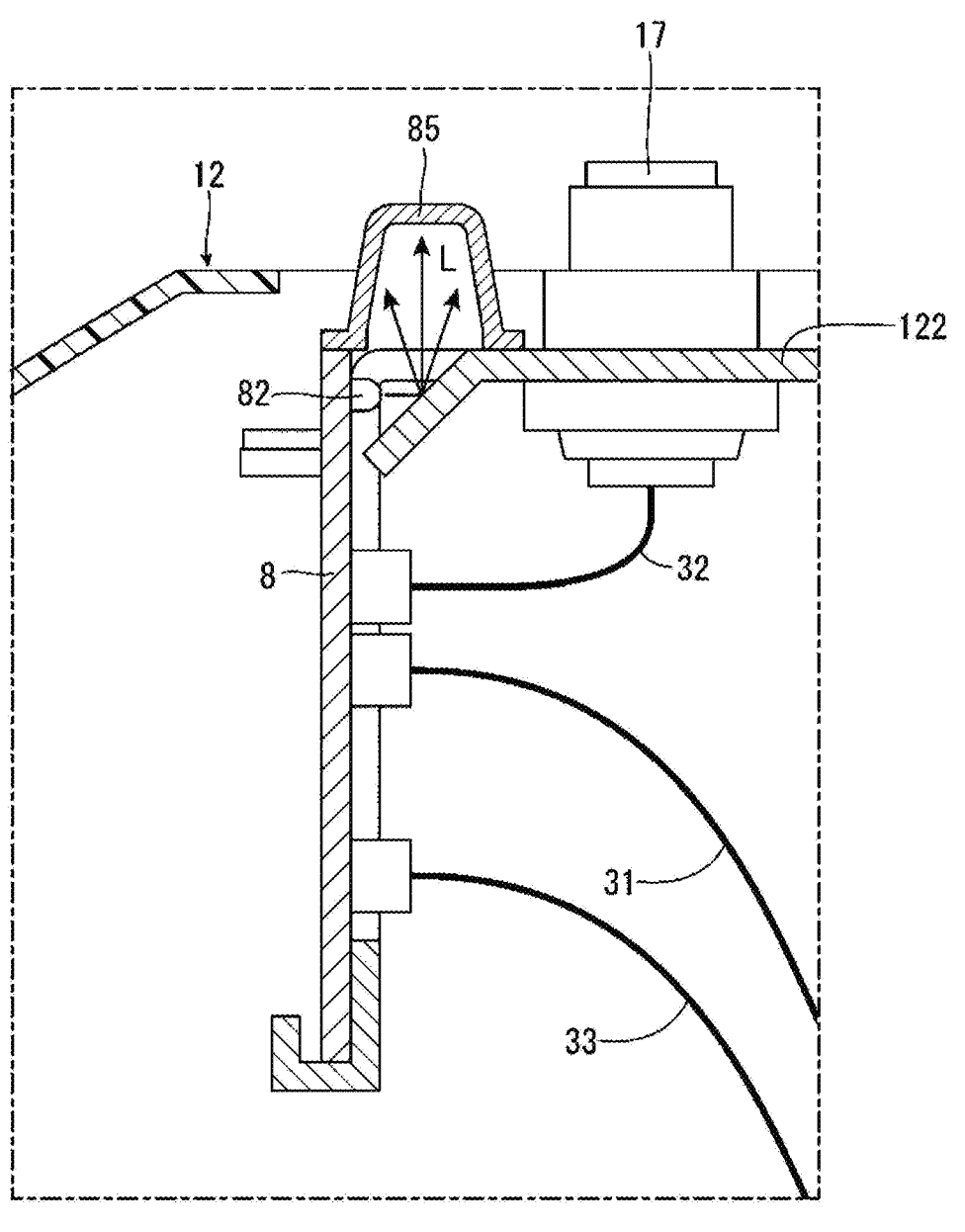
FIG. 13 is a cross-sectional view illustrating the enlarged distal end portion of the frame.

FIG. 1 is a side view illustrating a robot according to a first embodiment. FIG. 2 is a cross-sectional view illustrating a joined portion between a base and a first arm. FIG. 3 is a cross-sectional view of a second arm viewed from one side in a horizontal direction. FIG. 4 is a cross-sectional view of the second arm viewed from the other side in the horizontal direction. FIG. 5 is a top view illustrating an inside of the second arm. FIG. 6 is a perspective view illustrating an enlarged distal end portion of a frame. FIG. 7 is a cross-sectional view illustrating an enlarged intermediate pulley. FIGS. 8 and 9 are cross-sectional views illustrating modification examples of the intermediate pulley illustrated in FIG. 7, respectively. FIG. 10 is a cross-sectional view illustrating an intermediate pulley which is a comparative example in which a first bearing and a first belt do not overlap each other. FIG. 11 is a cross-sectional view illustrating a positional relationship between a fixed position and a belt tension force point. FIG. 12 is a cross-sectional view illustrating a modification example of the intermediate pulley illustrated in FIG. 7. FIG. 13 is a cross-sectional view illustrating the enlarged distal end portion of the frame.

An up/down direction in FIG. 1 matches a vertical direction. For this reason, hereinafter, an upper side in FIG. 1 will also be referred to as "up", and a lower side will also be referred to as "down". In addition, in the present specification, the term "vertical" means not only including a case of matching the vertical, but also including a case of being inclined with respect to the vertical within a range in which an effect of the present disclosure can be exhibited, for example, a case of being inclined within ÷5° with respect to the vertical. Similarly, in the present specification, the term "parallel" means not only including a case where two objects are parallel to each other, but also a case where the two objects are inclined from the parallel within a range in which the effect of the present disclosure can be exhibited, for example, a case where the two objects are inclined within ±5° with respect to the parallel.

A robot system 100 illustrated in FIG. 1 has a robot 1 and a control device 9 that controls driving of the robot 1.
Control Device 9

As illustrated in FIG. 1, the control device 9 has, for example, a control substrate 91 and a power supply substrate 92. However, without being limited thereto, the control substrate 91 and the power supply substrate 92 may be one substrate.

The control substrate 91 collectively controls the driving of each portion of the robot 1. The control substrate 91 includes a central processing unit (CPU), a random access memory (RAM), and a read only memory (ROM). The functions described above are achieved as the CPU reads and executes a program and data stored in the ROM. In addition, the control substrate 91 is electrically coupled to a host computer (not illustrated) and controls driving of each portion of the robot 1 based on a command from the host computer. However, without being limited thereto, a circuit and the like of the control substrate 91 may be divided into a plurality of substrates.

The power supply substrate 92 supplies power to the control substrate 91. The power supply substrate 92 includes a conversion circuit that converts power supplied from the outside into a predetermined value to supply the power to the control substrate 91. The conversion circuit varies depending on the configuration of the robot 1, but examples thereof include an AC/DC conversion circuit that converts an alternating current (AC) to a direct current (DC) and a booster circuit or a step-down circuit that converts a voltage level of a signal. However, without being limited thereto, a circuit and the like of the power supply substrate 92 may be divided into a plurality of substrates.

However, the configuration of the control device 9 is not particularly limited insofar as the driving of the robot 1 can be controlled. In addition, the control device 9 is disposed in a base 10 of the robot 1 in the present embodiment, but the disposition of the control device 9 is not particularly limited. For example, the control device 9 may be installed outside the base 10. In this case, the robot 1 and the control device 9 may be coupled by a cable or may be wirelessly coupled.

Robot 1

The robot 1 is a horizontal articulated robot (SCARA robot). As illustrated in FIG. 1, the robot 1 has the base 10 fixed to a floor or the like, a first arm 11 rotatably joined to the base 10, a second arm 12 rotatably joined to the first arm 11, a work head 13 disposed at the second arm 12, and a duct 14 that couples the base 10 and the second arm 12.

As illustrated in FIG. 2, the first arm 11 is joined to the base 10 at a proximal end portion thereof and rotates around a first rotation axis J1 along the vertical direction with respect to the base 10.

As illustrated in FIGS. 3 and 4, the second arm 12 is joined to the first arm 11 at a proximal end thereof and rotates around a second rotation axis J2, which is parallel to the first rotation axis J1, with respect to the first arm 11. In addition, the second arm 12 includes a hard arm base 121 joined to the first arm 11, a frame 122 fixed to the arm base 121, and a cover 123 covering the arm base 121 from above the frame 122. For example, the arm base 121 and the frame 122 are made of a lightweight and hard metal material such as aluminum, and the cover 123 is made of a lightweight resin material.

In addition, the second arm 12 includes an inertia sensor module 7 that measures inertia of the second arm 12. The inertia sensor module 7 is disposed on a distal end side of the second arm 12 with respect to a brake control substrate 8 and detects at least one of an angular speed and acceleration of the second arm 12. When an imaginary line segment passing through the second rotation axis J2 and a third rotation axis J3 is defined as an imaginary central axis, the inertial sensor module 7 is disposed at a position overlapping the imaginary central axis in plan view from a direction along the second rotation axis J2. However, without being limited thereto, the inertia sensor module 7 may be disposed at a position that does not overlap the imaginary central axis.

In addition, the frame 122 is a cantilever beam of which a proximal end portion is fixed to the arm base 121 and a distal end portion is a free end separated from the arm base 121. The duct 14 is coupled to such a frame 122. In addition, a connector 181 and a brake release button 17 for releasing a brake 243 to be described later are disposed at the frame 122. The connector 181 and the brake release button 17 are exposed to the outside of the second arm 12 without being covered with the cover 123. As illustrated in FIG. 1, a connector 182 that forms a pair with the connector 181 is disposed on a back surface of the base 10, and the connectors 181 and 182 are coupled to each other via wiring 31.

In addition, a lens 85 that is illuminated by light L incident from a light emitting element 82 to be described later is disposed at the frame 122. In addition, the lens 85 is exposed to the outside of the second arm 12 without being covered with the cover 123.

In addition, as illustrated in FIG. 6, the distal end portion of the frame 122 is supported by the arm base 121 via a pair of support members 41 and 42. Since the frame 122 is a cantilever beam as described above, a distal end side is easily bent up and down. For this reason, for example, there is a concern that the frame 122 is plastically deformed by stress applied when a user inserts a connector into the connector 181, when the brake release button 17 is pressed, or when wiring or a device coupled to the connector 181 is installed on the frame 122. Thus, by supporting the distal end portion of the frame 122 with the pair of support members 41 and 42, the deformation of the frame 122 can be effectively suppressed.

As illustrated in FIG. 1, the duct 14 is a tubular member disposed outside the first arm 11 and directly couples the base 10 and the second arm 12 without passing through the first arm 11. In addition, as illustrated in FIGS. 2 to 4, the duct 14 has a proximal end portion coupled to the base 10, has a distal end portion coupled to the second arm 12, and has a proximal end opening 141 that faces the inside of the base 10 and a distal end opening 142 that faces the inside of the second arm 12. Accordingly, the base 10 and the second arm 12 communicate with each other via the duct 14. In addition, a plurality of pieces of wiring 31 are drawn between the base 10 and the second arm 12 via the duct 14, and electronic components disposed at the second arm 12 and electronic components disposed at the base 10 are electrically coupled via the pieces of wiring 31. In addition, the wiring 31 is drawn to a distal end side of motors 231 and 241 through a gap between the motors 231 and 241, for example.

As illustrated in FIGS. 3 and 4, the work head 13 is disposed at a distal end portion of the second arm 12. In addition, the work head 13 has a spline nut 131 and a ball screw nut 132 that are coaxially disposed in the vertical direction and a spline shaft 133 that is inserted through the spline nut 131 and the ball screw nut 132. In such a work head 13, when the spline nut 131 is rotated, the spline shaft 133 rotates around a central axis thereof, which is the third rotation axis J3 parallel to the first rotation axis J1, and moves linearly (up and down) along the third rotation axis J3. When the ball screw nut 132 is rotated, the spline shaft 133 moves linearly along the third rotation axis J3. When both the spline nut 131 and the ball screw nut 132 are rotated, the spline shaft 133 rotates around the third rotation axis J3. Although not illustrated, an end effector according to work is mounted on a lower end portion of the spline shaft 133.

In addition, as illustrated in FIGS. 2 and 3, the robot 1 has a first arm drive mechanism 21 that rotates the first arm 11 around the first rotation axis J1 with respect to the base 10 and a second arm drive mechanism 22 that rotates the second arm 12 around the second rotation axis J2 with respect to the first arm 11.

As illustrated in FIG. 2, the first arm drive mechanism 21 has a decelerator 211 that rotatably joins the base 10 and the first arm 11 and an encoder built-in motor 212 disposed in the base 10. The motor 212 is a servo motor, particularly a three-phase motor driven by a three-phase alternating current, and is fixed to the base 10. The decelerator 211 is a wave gear device, a circular spline 211a is fixed to the base 10, and a flex spline 211b is fixed to the first arm 11. In addition, a rotation shaft of the motor 212 is fixed to a wave generator 211*c*. For this reason, the wave generator 211*c* rotates together with the rotation of the motor 212, and further, the flex spline 211*b* rotates with a predetermined deceleration ratio with respect to the rotation of the wave generator 211*c*. As a result, the first arm 11 rotates around the first rotation axis J1 with respect to the base 10. However, the configuration of the first arm drive mechanism 21 is not particularly limited.

The second arm drive mechanism 22 has the same configuration as that of the first arm drive mechanism 21. As illustrated in FIGS. 3 and 4, the second arm drive mechanism 22 has a decelerator 221 that rotatably joins the first arm 11 and the second arm 12 and an encoder built-in motor 222 disposed in the second arm 12. The motor 222 is a servo motor, particularly a three-phase motor driven by a three-phase alternating current, and is fixed to the arm base 121. The decelerator 221 is a wave gear device, a circular spline 221*a* is fixed to the arm base 121, and a flex spline 221*b* is fixed to the first arm 11. In addition, a rotation shaft of the motor 222 is fixed to a wave generator 221*c*. For this reason, the wave generator 221*c* rotates together with the rotation of the motor 222, and further, the flex spline 221*b* rotates with a predetermined deceleration ratio with respect to the rotation of the wave generator 221*c*. As a result, the second arm 12 rotates around the second rotation axis J2 with respect to the first arm 11. However, the configuration of the second arm drive mechanism 22 is not particularly limited.

In addition, as illustrated in FIGS. 3 to 5, the robot 1 has a spline shaft first drive mechanism 23 that rotates the spline nut 131 to rotate and linearly move the spline shaft 133 and a spline shaft second drive mechanism 24 that rotates the ball screw nut 132 to linearly move the spline shaft 133.

As illustrated in FIGS. 3 and 5, the spline shaft first drive mechanism 23 has an encoder built-in motor 231 disposed in the second arm 12 and a deceleration mechanism 232 that is a power transmission mechanism which transmits rotation of the motor 231 to the spline nut 131. The motor 231 is a servo motor, particularly a three-phase motor driven by a three-phase alternating current, and is fixed to the arm base 121.

The deceleration mechanism 232 has a first pulley 51 fixed to the rotation shaft of the motor 231, a second pulley 52 fixed to the spline nut 131, a support member 6 fixed to the arm base 121, an intermediate pulley 54 supported by the support member 6 via a bearing 50 (not illustrated in FIGS. 3 and 5) and rotates around a fourth rotation axis J4, which is parallel to the first rotation axis J1, with respect to the arm base 121, a first belt 55 wound around the first pulley 51 and the intermediate pulley 54, and a second belt 56 wound around the intermediate pulley 54 and the second pulley 52.

In addition, as illustrated in FIG. 7, the intermediate pulley 54 has a first intermediate pulley 541, a second intermediate pulley 542 that is positioned below the first intermediate pulley 541 and that has a diameter smaller than that of the first intermediate pulley 541, and a shaft portion 543 that is disposed along the fourth rotation axis J4 and that couples the first intermediate pulley 541 and the second intermediate pulley 542. In addition, the intermediate pulley 54 is rotatably supported by the support member 6 via the bearing 50 at the shaft portion 543.

In addition, as illustrated in FIG. 3, the first intermediate pulley 541 is disposed to be aligned at the same height as that of the first pulley 51. In addition, the first intermediate pulley 541 has a diameter larger than that of the first pulley 51, and the first belt 55 is wound around the first pulley 51 and the first intermediate pulley 541. A first deceleration mechanism 232*a*, which is a front stage portion, is configured by the first pulley 51, the first intermediate pulley 541, and the first belt 55. On the other hand, the second intermediate pulley 542 is disposed to be aligned at the same height as that of the second pulley 52. In addition, the second intermediate pulley 542 has a diameter smaller than that of the second pulley 52, and the second belt 56 is wound around the second intermediate pulley 542 and the second pulley 52. A second deceleration mechanism 232*b*, which is a back stage portion, is configured by the second intermediate pulley 542, the second pulley 52, and the second belt 56.

In such a configuration, rotation of the motor 231 is transmitted to the first intermediate pulley 541 via the first pulley 51 and the first belt 55, and the first intermediate pulley 541 and the second intermediate pulley 542 rotate integrally around the fourth rotation axis J4. In addition, the rotation of the second intermediate pulley 542 is transmitted to the second pulley 52 via the second belt 56, and the second pulley 52 and the spline nut 131 integrally rotate around the third rotation axis J3. Accordingly, the spline shaft 133 rotates and moves linearly. As described above, as the deceleration mechanism 232 includes the first deceleration mechanism 232*a* and the second deceleration mechanism 232*b*, the rotation of the motor 231 can be decelerated in two stages, and the spline nut 131 can be rotated with larger torque. A deceleration ratio of the first deceleration mechanism 232*a*, that is, a pulley ratio between the first pulley 51 and the first intermediate pulley 541 is not particularly limited, but in the present embodiment, the deceleration ratio is 1:4. In addition, a deceleration ratio of the second deceleration mechanism 232*b*, that is, a pulley ratio between the second intermediate pulley 542 and the second pulley 52 is not particularly limited, but in the present embodiment, the deceleration ratio is 1:4. That is, the entire deceleration mechanism 232 can exhibit a deceleration ratio of 1:16.

The entire configuration of the power transmission mechanism is described above. However, the power transmission mechanism is not limited to the deceleration mechanism 232 and may be, for example, a mechanism that transmits rotation of the motor 231 to the spline nut 131 at a constant speed or a mechanism that accelerates the rotation of the motor 231 and that transmits the rotation to the spline nut 131.

Next, the configuration of the intermediate pulley 54 included in the deceleration mechanism 232 will be described in detail. As described above, the intermediate pulley 54 has the first intermediate pulley 541, the second intermediate pulley 542 positioned below the first intermediate pulley 541, and the shaft portion 543 coupling the first intermediate pulley 541 and the second intermediate pulley 542, and is rotatably supported by the support member 6 fixed to the arm base 121 via the bearing 50 at the shaft portion 543.

As illustrated in FIG. 7, the first intermediate pulley 541 has a disk-shaped base portion 541*a* orthogonal to the fourth rotation axis J4, a cylindrical belt mounting portion 541*b* that extends downward from an outer edge of the base portion 541*a* and that has an outer peripheral surface around which the first belt 55 is wound, and an annular flange 541*c* that is disposed at an upper end portion of the belt mounting portion 541*b* and that suppresses detachment of the first belt 55 from the belt mounting portion 541*b*. The same flange as the flange 541*c* is not formed at a lower end portion of the belt mounting portion 541*b*. Accordingly, the weight of the first intermediate pulley 541 can be reduced. However, without being limited thereto, a flange may be formed at at least one of the upper end portion and the lower end portion of the belt mounting portion 541b, or no flange may be formed at any one of the upper end portion and the lower end portion.

With such a configuration, the first intermediate pulley 541 is formed with a cylindrical recess portion 541d that is open to a lower surface thereof, that is, a surface on a second intermediate pulley 542 side. Further, the first intermediate pulley 541 has a cylindrical shaft portion insertion portion 541e which protrudes from a lower surface of the base portion 541a into the recess portion 541d and into which an upper end portion of the shaft portion 543 is inserted. A plurality of teeth that mesh with teeth formed at the first belt 55 are formed at equal intervals along a circumferential direction at the outer peripheral surface of the belt mounting portion 541b. However, without being limited thereto, the first belt 55 and the first intermediate pulley 541 may not be formed with teeth.

The second intermediate pulley 542 is disposed coaxially with the first intermediate pulley 541 below the first intermediate pulley 541. In addition, the second intermediate pulley 542 has a diameter smaller than that of the first intermediate pulley 541. In other words, the first intermediate pulley 541 has a diameter larger than that of the second intermediate pulley 542. In addition, a plurality of teeth that mesh with teeth formed at the second belt 56 are formed at equal intervals along a circumferential direction on an outer peripheral surface of the second intermediate pulley 542. In addition, a flange for suppressing vertical displacement of the second belt 56 is not formed at an upper end portion and a lower end portion of the second intermediate pulley 542. For this reason, the second belt 56 is easily mounted on the second intermediate pulley 542. In addition, the weight of the second intermediate pulley 542 can also be reduced. However, without being limited thereto, the second belt 56 and the second intermediate pulley 542 may not be formed with teeth. In addition, a flange may be formed at at least one of the upper end portion and the lower end portion of the second intermediate pulley 542, or no flange may be formed at any one of the upper end portion and the lower end portion.

The shaft portion 543 is positioned between the first intermediate pulley 541 and the second intermediate pulley 542. In addition, the shaft portion 543 has a cylindrical shape extending along the fourth rotation axis J4. In addition, the shaft portion 543 has a diameter smaller than that of the second intermediate pulley 542. In addition, the shaft portion 543 is integrally formed with the second intermediate pulley 542, and an upper end portion thereof is inserted into the shaft portion insertion portion 541e via the recess portion 541d and is screwed to the first intermediate pulley 541. In particular, in the present embodiment, the first intermediate pulley 541 and the shaft portion 543 are fixed by inserting four screws B through the base portion 541a and then tightening the screws B to the shaft portion 543. In addition, as illustrated in FIG. 5, the four screws B are disposed at equal intervals around the fourth rotation axis J4. As described above, by using the plurality of screws B, for example, a nominal diameter (outer diameter) of the screw B can be reduced compared to a case where the first intermediate pulley 541 and the shaft portion 543 are fixed with the use of one screw B. For this reason, tightening torque is reduced accordingly, and the assemblability of the robot 1 is improved. In addition, by using the plurality of screws B, even when one screw B is loosened, a state where the first intermediate pulley 541 and the shaft portion 543 are fixed can be firmly maintained by the other screws B, so that the loosening of the first intermediate pulley 541 can also be effectively suppressed. However, a method of fixing the first intermediate pulley 541 and the shaft portion 543 is not particularly limited.

The configuration of the intermediate pulley 54 is not particularly limited. For example, a configuration where the first intermediate pulley 541, the second intermediate pulley 542, and the shaft portion 543 are formed separately from each other and are fixed to each other by a screw or the like may be adopted. In addition, a configuration where the first intermediate pulley 541 and the shaft portion 543 are integrally formed, and the shaft portion 543 and the second intermediate pulley 542 are fixed by a screw or the like may be adopted. In addition, a configuration where the first intermediate pulley 541, the second intermediate pulley 542, and the shaft portion 543 are integrally formed may be adopted.

As illustrated in FIG. 7, the intermediate pulley 54 is rotatably supported by the support member 6 via the bearing 50 at the shaft portion 543. The bearing 50 has a plurality of bearings disposed along the fourth rotation axis J4. In the present embodiment, the bearing 50 has a first bearing 501 and a second bearing 502 disposed along the fourth rotation axis J4.

In addition, each of the first bearing 501 and the second bearing 502 is a deep groove ball bearing and has an annular outer ring, an annular inner ring disposed inside the outer ring, a plurality of rolling bodies (balls) disposed between the outer ring and the inner ring, and a holder that holds the rolling bodies. However, the holder is not illustrated. The shaft portion 543 is inserted through the inner rings of the first and second bearings 501 and 502. However, the first bearing 501 and the second bearing 502 are not limited to the deep groove ball bearing, may be a ball bearing other than the deep groove ball bearing, such as an angular ball bearing and a thrust ball bearing, or may be a roller bearing, such as a cylindrical roller bearing and a thrust cylindrical roller bearing.

In addition, the first bearing 501 and the second bearing 502 are in contact with each other. That is, the two bearings disposed adjacent to each other along the fourth rotation axis J4 are in contact with each other. Specifically, a lower surface of the inner ring of the first bearing 501 and an upper surface of the inner ring of the second bearing 502 are in contact with each other, and a lower surface of the outer ring of the first bearing 501 and an upper surface of the outer ring of the second bearing 502 are in contact with each other. With such a configuration, an increase in the height of the bearing 50, that is, a length in a direction along the fourth rotation axis J4 can be suppressed, and the intermediate pulley 54 can be reduced in size. However, without being limited thereto, for example, as illustrated in FIG. 8, a spacer S may be disposed between the first bearing 501 and the second bearing, and the first bearing 501 and the second bearing may be disposed to be separated from each other.

Further, the first bearing 501 is in contact with the first intermediate pulley 541, and the second bearing 502 is in contact with the second intermediate pulley 542. Specifically, an upper surface of the inner ring of the first bearing 501 is in contact with a lower surface of the shaft portion insertion portion 541e, and a lower surface of the inner ring of the second bearing 502 is in contact with an upper surface of the second intermediate pulley 542. Accordingly, since a configuration where the first and second bearings 501 and 502 are interposed between the first intermediate pulley 541 and the second intermediate pulley 542 is adopted, positional displacement or the like of the first and second bearings 501 and 502 can be effectively suppressed. Further, a total length of the shaft portion 543, that is, a length in the direction along the fourth rotation axis J4 can be shortened, and the intermediate pulley 54 can also be reduced in size. However, without being limited thereto, for example, as illustrated in FIG. 9, the upper end portion of the shaft portion 543 may be reduced in diameter with respect to the lower end portion to form a step 543*a* at a boundary therebetween, and the lower surface of the second bearing 502 may be brought into contact with the step 543*a*. In addition, the spacer S may be disposed instead of the shaft portion insertion portion 541*e* so that the upper surface of the first bearing 501 may be brought into contact with the spacer S, or the spacer S may be disposed instead of the step 543*a* so that the lower surface of the second bearing 502 may be brought into contact with the spacer S.

The bearing 50 is not particularly limited, and the second bearing 502 may be omitted. That is, the first bearing 501 alone may be provided. In this case, it is preferable that the first bearing 501 is an angular ball bearing. In addition, the bearing 50 may have at least one bearing positioned between the first bearing 501 and the second bearing 502.

As illustrated in FIG. 7, the support member 6 is disposed between the first intermediate pulley 541 and the second intermediate pulley 542. For this reason, the first belt 55 is easily mounted on the first intermediate pulley 541, and the second belt 56 is easily mounted on the second intermediate pulley 542. That is, the first belt 55 can be wound around the first intermediate pulley 541 from above the support member 6 without interfering with the support member 6, and the second belt 56 can be wound around the second intermediate pulley 542 from below the support member 6 without interfering with the support member 6. In addition, the support member 6 has a fixing plate 62 fixed to the arm base 121 and a bearing holding portion 61 protruding upward from the fixing plate 62 and through which the intermediate pulley 54 is inserted. In the present embodiment, the fixing plate 62 and the bearing holding portion 61 are configured separately and fixed with a screw.

The bearing holding portion 61 has a cylindrical base portion 611 coaxially disposed with the fourth rotation axis J4 and an annular flange 612 protruding outward from the base portion 611. The shaft portion 543 of the intermediate pulley 54 is inserted through the base portion 611, the first intermediate pulley 541 is positioned above the base portion 611, and the second intermediate pulley 542 is positioned below the base portion 611. In addition, an upper end portion of the base portion 611 is inserted into the recess portion 541*d* of the first intermediate pulley 541. That is, the base portion 611 and the first intermediate pulley 541 overlap each other in plan view from a direction orthogonal to the fourth rotation axis J4. In addition, an annular claw portion 614 protruding inward is formed at the upper end portion of the base portion 611. In addition, a plurality of screw holes 613 disposed at equal intervals around the fourth rotation axis J4 are formed in a lower surface of the base portion 611.

The fixing plate 62 is disposed between the first intermediate pulley 541 and the second intermediate pulley 542. In addition, the fixing plate 62 has a plate shape orthogonal to the fourth rotation axis J4 and is screwed to the arm base 121 at a plurality of locations at an outer edge portion. In addition, the fixing plate 62 has a through-hole 621 penetrating an upper surface and a lower surface thereof. The bearing holding portion 61 and the fixing plate 62 are fixed by a screw in a state where a lower end portion of the base portion 611 is inserted through the through-hole 621 and the flange 612 is placed on an upper surface of the fixing plate

62. In a state where the bearing holding portion 61 and the fixing plate 62 are fixed, a lower surface of the bearing holding portion 61 and a lower surface of the fixing plate 62 are flush with each other.

However, the configuration of the support member 6 is not particularly limited. For example, the fixing plate 62 and the bearing holding portion 61 may be integrally formed. In addition, the bearing holding portion 61 and the fixing plate 62 may be fixed by a method other than a screw, such as welding, screwing, and fitting. In addition, the lower surface of the bearing holding portion 61 and the lower surface of the fixing plate 62 may not be flush with each other and may be displaced in the direction along the fourth rotation axis J4.

As illustrated in FIG. 7, the first bearing 501 and the second bearing 502 are inserted into the bearing holding portion 61 together with the shaft portion 543 and are held between an outer peripheral surface of the shaft portion 543 and an inner peripheral surface of the bearing holding portion 61. In addition, the upper surface of the first bearing 501 is in contact with the claw portion 614. Specifically, an upper surface of the outer ring of the first bearing 501 is in contact with a lower surface of the claw portion 614. In addition, the lower surface of the second bearing 502 is flush with the lower surface of the bearing holding portion 61. Specifically, a lower surface of the outer ring of the second bearing 502 is flush with the lower surface of the bearing holding portion 61. The screw B2 is tightened in each screw hole 613 formed in the lower surface of the bearing holding portion 61, and a head B21 of each screw B2 is in contact with the lower surface of the outer ring of the second bearing 502. With such a configuration, since a configuration where the first and second bearings 501 and 502 are interposed between the claw portion 614 and each screw B2 is adopted, positional displacement or the like of the first and second bearings 501 and 502 can be effectively suppressed. In particular, by making the lower surface of the second bearing 502 and the lower surface of the bearing holding portion 61 flush with each other, the second bearing can be stably held, the total length of the bearing holding portion 61, that is, the length in the direction along the fourth rotation axis J4 can be shortened, and accordingly, a separation distance between the first intermediate pulley 541 and the second intermediate pulley 542 can be shortened. For this reason, the intermediate pulley 54 can be reduced in size.

In addition, at least a part of the bearing 50 is positioned in the recess portion 541*d*. In plan view from the direction orthogonal to the fourth rotation axis J4, the bearing 50 overlaps the first belt 55. With such a configuration, for example, the separation distance between the first intermediate pulley 541 and the second intermediate pulley 542 can be shortened compared to a configuration where the bearing 50 and the first belt 55 do not overlap each other as illustrated in FIG. 10. For this reason, the intermediate pulley 54 can be reduced in size. Further, as illustrated in FIG. 11, a separation distance D (distance in the direction along the fourth rotation axis J4) between a fixed position P1 of the first intermediate pulley 541 and a belt tension force point P2 of the first belt 55 can be further reduced. For this reason, a load applied to the shaft portion 543 can be effectively reduced, and the shaft portion 543 can be reduced in diameter and weight. The fixed position P1 is a place where an upper end of the first bearing 501 and the first intermediate pulley 541 come into contact with each other, and the belt tension force point P2 is a place where a center of the first belt 55 in a width direction and the first intermediate pulley 541 come into contact with each other. In addition, in the present embodiment, the separation distance D>0 is acceptable, but the separation distance D=0 is most preferable.

Herein, as illustrated in FIG. 12, a configuration where a recess portion 542*d* that is open to the upper surface of the second intermediate pulley 542 is formed, at least a part of the bearing 50 is positioned in the recess portion 542*d*, and the bearing 50 overlaps the second belt 56 in plan view from the direction orthogonal to the fourth rotation axis J4 may be adopted. Even with such a configuration, the same effect as that of the present embodiment is also obtained. However, as described above, since the second intermediate pulley 542 has a diameter smaller than that of the first intermediate pulley 541, the recess portion 542*d* is smaller than the recess portion 541*d*. For this reason, the shaft portion 543 and the bearing 50 are required to be reduced in diameter, and there is a concern in which the intermediate pulley 54 is insufficient in rigidity depending on a shape, a configuring material, and the like of the shaft portion 543 or the bearing 50. From such a point of view, it is preferable to form the recess portion 541*d* in the first intermediate pulley 541 as in the present embodiment. Accordingly, the insufficient rigidity of the shaft portion 543 or the bearing 50 can be effectively suppressed.

In particular, as illustrated in FIG. 7, in the present embodiment, the entire first bearing 501 that is included in the bearing 50 and that is positioned closest to a first intermediate pulley 541 side is positioned in the recess portion 541*d*. With such a configuration, the intermediate pulley 54 can be further reduced in size. In addition, the separation distance D between the fixed position P1 of the first intermediate pulley 541 and the belt tension force point P2 of the first belt 55 can be further reduced, and a load applied to the shaft portion 543 can be more effectively reduced. However, without being limited thereto, only a part of the first bearing 501 may be positioned in the recess portion 541*d*, and the lower end portion may protrude outward from the recess portion 541*d*.

In addition, the second bearing 502 that is included in the bearing 50 and that is positioned closest to the second intermediate pulley 542 side overlaps the fixing plate 62 in plan view from the direction orthogonal to the fourth rotation axis J4. With such a configuration, the second bearing 502 can be held at a location of the support member 6 having high rigidity. For this reason, the fourth rotation axis J4 can be stabilized, and the intermediate pulley 54 can be smoothly rotated around the fourth rotation axis J4. However, without being limited thereto, the second bearing 502 may not overlap the fixing plate 62 in plan view from the direction orthogonal to the fourth rotation axis J4.

The intermediate pulley 54 described above can be assembled through, for example, a step of inserting the first and second bearings 501 and 502 into the bearing holding portion 61 from below, a step of fixing the first and second bearings 501 and 502 to the bearing holding portion 61 by tightening the screws B2 to the bearing holding portion 61, a step of bringing the upper surface of the second intermediate pulley 542 into contact with the second bearing 502 by inserting the shaft portion 543 into the first and second bearings 501 and 502 from below, a step of inserting the upper end portion of the shaft portion 543 into the shaft portion insertion portion 541*e* of the first intermediate pulley 541, and a step of fixing the first intermediate pulley 541 and the shaft portion 543 with the use of the screws B. However, the assembling method of the intermediate pulley 54 is not particularly limited.

As illustrated in FIG. 4, the spline shaft second drive mechanism 24 has the encoder built-in motor 241 which is a second motor disposed in the second arm 12, a deceleration mechanism 242 that transmits rotation of the motor 241 to the ball screw nut 132, and the brake 243 for the motor 241. The motor 241 is a servo motor, particularly a three-phase motor driven by a three-phase alternating current and is fixed to the arm base 121.

The deceleration mechanism 242 has a pulley 242*a* attached to a rotation shaft of the motor 241, a pulley 242*b* attached to the ball screw nut 132, and a belt 242*c* wound around the pulleys 242*a* and 242*b*. In such a configuration, rotation of the motor 241 is transmitted to the pulley 242*b* via the pulley 242*a* and the belt 242*c*, and the pulley 242*b* and the ball screw nut 132 integrally rotate around the third rotation axis J3. Accordingly, the spline shaft 133 linearly moves. As described above, the rotation of the motor 241 can be decelerated by using the deceleration mechanism 242, and the ball screw nut 132 can be rotated with sufficiently large torque. However, the configuration of the spline shaft second drive mechanism 24 is not particularly limited.

The brake 243 is an electromagnetic brake attached to the motor 241 and has a pair of plates 243*a* and 243*b* disposed to face each other. In addition, one plate 243*a* is fixed to the motor 241, and the other plate 243*b* is fixed to the rotation shaft of the motor 241 and rotates together with the rotation shaft. Then, through ON/OFF control of power supply, a brake state where the plates 243*a* and 243*b* are brought into contact with each other to restrict the rotation of the rotation shaft and a brake release state where the plates 243*a* and 243*b* are separated from each other to allow the rotation of the rotation shaft are switched. In particular, the brake 243 of the present embodiment is an unexcited operation type electromagnetic brake, is in the brake release state when power is supplied (ON), and is in the brake state when power is cut off (OFF). However, the configuration of the brake 243 is not particularly limited.

In addition, as illustrated in FIG. 13, the brake control substrate 8 that controls the brake 243 is fixed to the frame 122. The brake control substrate 8 is electrically coupled to the control substrate 91 via the wiring 31. In addition, the brake control substrate 8 is electrically coupled to the brake 243 via wiring 32 and is electrically coupled to the brake release button 17 via wiring 33. Such a brake control substrate 8 controls driving of the brake 243 based on a command from the control substrate 91 and switches between the brake state/brake release state. In addition, the brake control substrate 8 controls the driving of the brake 243 based on the operation of the brake release button 17 and switches between the brake state/brake release state.

In addition, the robot 1 has the light emitting element 82 mounted on the brake control substrate 8. The light emitting element 82 is, for example, a light emitting diode (LED). The light L emitted from the light emitting element 82 is diffusely reflected upward by the frame 122 and then is incident to the lens 85. Accordingly, the lens 85 is illuminated. For this reason, by controlling driving of the light emitting element 82 to switch the lighting/blinking/extinguishing of the lens 85 or to switch a light emission color of the lens 85, the user can be notified of various types of information via the lens 85.

The brake control substrate 8 causes the light emitting element 82 to emit the light L of a predetermined color and illuminates the lens 85 while power is supplied to the motors 212, 222, 231, and 241, that is, while the power of the robot 1 is turned on. Hereinafter, this state is also referred to as a first light emission state. Accordingly, the user can be easily notified that the power of the robot 1 is turned on. In addition, when the brake release button 17 is pressed and the brake 243 is brought into the brake release state, the brake control substrate 8 causes the light emitting element 82 to emit the light L of a color different from the first light emission state and illuminates the lens 85. Hereinafter, this state is also referred to as a second light emission state. Accordingly, the user can be easily notified that the brake 243 is in the brake release state. In addition, by switching between the first light emission state and the second light emission state, the user can be more clearly notified of the state of the robot 1. However, the notification method is not particularly limited. For example, the first light emission state may be lighting and the second light emission state may be extinguishing, or the first light emission state may be lighting and the second light emission state may be blinking.

The brake control substrate 8 described above includes a central processing unit (CPU), a read only memory (ROM), and the like. The functions described above are achieved as the CPU reads and executes a program and data stored in the ROM.

The robot system 100 is described above. The robot 1 included in such a robot system 100 includes the base 10, the first arm 11 that is joined to the base 10 and that rotates around the first rotation axis J1 with respect to the base 10, the second arm 12 that is joined to the first arm 11 and that rotates around the second rotation axis J2, which is parallel to the first rotation axis J1, with respect to the first arm 11, the work head 13 that includes the spline shaft 133 which is disposed at the second arm 12 and which is disposed along the third rotation axis J3 parallel to the first rotation axis J1 and the spline nut 131 which is mounted on the spline shaft 133, and in which that the spline shaft 133 at least rotates around the third rotation axis J3 when the spline nut 131 is rotated, and the spline shaft first drive mechanism 23 that rotates the spline nut 131 to at least rotate the spline shaft 133 around the third rotation axis J3. In addition, the spline shaft first drive mechanism 23 includes the motor 231 and the deceleration mechanism 232 that is a power transmission mechanism which transmits the rotation of the motor 231 to the spline nut 131. In addition, the deceleration mechanism 232 has the first pulley 51 fixed to the rotation shaft of the motor 231, the second pulley 52 fixed to the spline nut 131, the intermediate pulley 54 that is supported by the support member 6 via the bearing 50 and that rotates around the fourth rotation axis J4, which is parallel to the first rotation axis J1, with respect to the second arm 12, the first belt 55 wound around the first pulley 51 and the intermediate pulley 54, and the second belt 56 wound around the intermediate pulley 54 and the second pulley 52. In addition, the intermediate pulley 54 has the first intermediate pulley 541 around which the first belt 55 is wound, the second intermediate pulley 542 that is disposed side by side with the first intermediate pulley 541 in the direction along the fourth rotation axis J4 and around which the second belt 56 is wound, and the shaft portion 543 that is disposed along the fourth rotation axis J4 and that couples the first intermediate pulley 541 and the second intermediate pulley 542, and is supported by the support member 6 via the bearing 50 at the shaft portion 543. One of the first intermediate pulley 541 and the second intermediate pulley 542, in the present embodiment, the first intermediate pulley 541 has the recess portion 541*d* which is open to the other side, that is, the second intermediate pulley 542 side and into which the shaft portion 543 is inserted, at least a part of the bearing 50 is positioned in the recess portion 541*d*, and in plan view from the direction orthogonal to the fourth rotation axis J4, the bearing 50 and the first belt 55 or the second belt 56, in the present embodiment, the bearing 50 and the first belt 55 overlap each other. With such a configuration, the separation distance between the first intermediate pulley 541 and the second intermediate pulley 542 can be shortened, and the intermediate pulley 54 can be reduced in size. Further, the separation distance D between the fixed position P1 of the first intermediate pulley 541 and the belt tension force point P2 of the first belt 55 can be reduced, and a load applied to the shaft portion 543 can be effectively reduced. For this reason, the shaft portion 543 can be reduced in diameter and weight.

In addition, as described above, the first intermediate pulley 541 has a diameter larger than that of the second intermediate pulley 542, the first intermediate pulley 541 has the recess portion 541*d*, and the bearing 50 and the first belt 55 overlap each other in plan view from the direction orthogonal to the fourth rotation axis J4. With such a configuration, insufficient rigidity of the shaft portion 543 or the bearing 50 can be effectively suppressed.

In addition, as described above, the bearing 50 includes the first bearing 501 that is a first bearing which is disposed along the fourth rotation axis J4 and which is positioned closest to the first intermediate pulley 541 side and the second bearing 502 that is a second bearing which is disposed along the fourth rotation axis J4 and which is positioned closest to the second intermediate pulley 542 side. The entire first bearing 501 is positioned in the recess portion 541*d*. With such a configuration, the intermediate pulley 54 can be further reduced in size.

In addition, as described above, a surface of the first bearing 501 on the first intermediate pulley 541 side is in contact with the first intermediate pulley 541. With such a configuration, the total length of the shaft portion 543, that is, the length in the direction along the fourth rotation axis J4 can be shortened, and the intermediate pulley 54 can be reduced in size.

In addition, as described above, the first bearing 501 and the second bearing 502 are in contact with each other. With such a configuration, the total length of the shaft portion 543, that is, the length in the direction along the fourth rotation axis J4 can be shortened, and the intermediate pulley 54 can be reduced in size.

In addition, as described above, the support member 6 has the fixing plate 62 that is positioned between the first intermediate pulley 541 and the second intermediate pulley 542 in plan view from the direction orthogonal to the fourth rotation axis J4 and that is fixed to the second arm 12, and the second bearing 502 overlaps the fixing plate 62 in plan view from the direction orthogonal to the fourth rotation axis J4. With such a configuration, the second bearing 502 can be held at a location of the support member 6 having high rigidity. For this reason, the fourth rotation axis J4 can be stabilized, and the intermediate pulley 54 can be smoothly rotated around the fourth rotation axis J4.

In addition, as described above, the support member 6 has the tubular bearing holding portion 61 inserted into the recess portion 541*d*, the shaft portion 543 is inserted through the bearing holding portion 61, and the bearing 50 is disposed between the outer peripheral surface of the shaft portion 543 and the inner peripheral surface of the bearing holding portion 61. With such a configuration, the bearing 50 is easily disposed.

In addition, as described above, a surface of the second bearing 502 on the second intermediate pulley 542 side is flush with a surface of the bearing holding portion 61 on the second intermediate pulley 542 side. With such a configuration, the total length of the bearing holding portion 61, that is, the length in the direction along the fourth rotation axis J4 can be shortened, and accordingly, the separation distance between the first intermediate pulley 541 and the second intermediate pulley 542 can be shortened. For this reason, the intermediate pulley 54 can be reduced in size.

In addition, as described above, the first intermediate pulley 541 has a diameter larger than that of the second intermediate pulley 542, the first intermediate pulley 541 has the recess portion 541d, the bearing 50 and the first belt 55 overlap each other in plan view from the direction orthogonal to the fourth rotation axis J4, the support member 6 has the fixing plate 62 that is positioned between the first intermediate pulley 541 and the second intermediate pulley 542 in plan view from the direction orthogonal to the fourth rotation axis J4 and that is fixed to the second arm 12 and the tubular bearing holding portion 61 that protrudes from the fixing plate 62 to the first intermediate pulley 541 side and that is inserted into the recess portion 541d, the bearing 50 is inserted through the bearing holding portion 61, the bearing 50 is disposed between the outer peripheral surface of the shaft portion 543 and the inner peripheral surface of the bearing holding portion 61, the bearing 50 includes the first bearing 501 that is disposed along the fourth rotation axis J4 and that is positioned closest to the first intermediate pulley 541 side and the second bearing 502 that is disposed along the fourth rotation axis J4 and that is positioned closest to the second intermediate pulley 542 side, the first bearing 501 is entirely positioned in the recess portion 541d and has the surface on the first intermediate pulley 541 side in contact with the first intermediate pulley 541, the second bearing 502 overlaps the fixing plate 62 in plan view from the direction orthogonal to the fourth rotation axis J4, and the surface of the second bearing 502 on the second intermediate pulley 542 side is flush with the surface of the bearing holding portion 61 on the second intermediate pulley 542 side and is in contact with the head B21 of the screw B2 that is tightened to the surface of the bearing holding portion 61 on the second intermediate pulley 542 side. With such a configuration, the intermediate pulley 54 can be reduced in size. In addition, the fourth rotation axis J4 can be stabilized, and the intermediate pulley 54 can be smoothly rotated around the fourth rotation axis J4. In addition, since a configuration where the first and second bearings 501 and 502 are interposed between the first intermediate pulley 541 and the screw B2 is adopted, positional displacement or the like of the first and second bearings 501 and 502 can be effectively suppressed.

In addition, as described above, the robot system 100 has the robot 1 and the control device 9 that controls the driving of the robot 1. In addition, the robot 1 includes the base 10, the first arm 11 that is joined to the base 10 and that rotates around the first rotation axis J1 with respect to the base 10, the second arm 12 that is joined to the first arm 11 and that rotates around the second rotation axis J2, which is parallel to the first rotation axis J1, with respect to the first arm 11, the work head 13 that includes the spline shaft 133 which is disposed at the second arm 12 and which is disposed along the third rotation axis J3 parallel to the first rotation axis J1 and the spline nut 131 which is mounted on the spline shaft 133, and in which the spline shaft 133 at least rotates around the third rotation axis J3 when the spline nut 131 is rotated, and the spline shaft first drive mechanism 23 that rotates the spline nut 131 to at least rotate the spline shaft 133 around the third rotation axis J3. In addition, the spline shaft first drive mechanism 23 includes the motor 231 and the deceleration mechanism 232 that is a power transmission mechanism which transmits the rotation of the motor 231 to the spline nut 131. In addition, the deceleration mechanism 232 has the first pulley 51 fixed to the rotation shaft of the motor 231, the second pulley 52 fixed to the spline nut 131, the intermediate pulley 54 that is supported by the support member 6 via the bearing 50 and that rotates around the fourth rotation axis J4, which is parallel to the first rotation axis J1, with respect to the second arm 12, the first belt 55 wound around the first pulley 51 and the intermediate pulley 54, and the second belt 56 wound around the intermediate pulley 54 and the second pulley 52. In addition, the intermediate pulley 54 has the first intermediate pulley 541 around which the first belt 55 is wound, the second intermediate pulley 542 that is disposed side by side with the first intermediate pulley 541 in the direction along the fourth rotation axis J4 and around which the second belt 56 is wound, and the shaft portion 543 that is disposed along the fourth rotation axis J4 and that couples the first intermediate pulley 541 and the second intermediate pulley 542, and is supported by the support member 6 via the bearing 50 at the shaft portion 543. One of the first intermediate pulley 541 and the second intermediate pulley 542, in the present embodiment, the first intermediate pulley 541 has the recess portion 541d which is open to the other side, that is, the second intermediate pulley 542 side and into which the shaft portion 543 is inserted, at least a part of the bearing 50 is positioned in the recess portion 541d, and in plan view from the direction orthogonal to the fourth rotation axis J4, the bearing 50 and the first belt 55 or the second belt 56, in the present embodiment, the bearing 50 and the first belt 55 overlap each other. With such a configuration, the separation distance between the first intermediate pulley 541 and the second intermediate pulley 542 can be shortened, and the intermediate pulley 54 can be reduced in size. Further, the separation distance D between the fixed position P1 of the first intermediate pulley 541 and the belt tension force point P2 of the first belt 55 can be further reduced, and a load applied to the shaft portion 543 can be effectively reduced. Thus, the shaft portion 543 can be reduced in diameter and light.

The robot and the robot system of the present disclosure are described hereinbefore based on the illustrated embodiment. However, the present disclosure is not limited thereto, and the configuration of each portion can be replaced with any configuration having the same function. In addition, any other configurations may be added to the present disclosure. For example, in the embodiment described above, the robot 1 has the duct 14, but the duct 14 may be omitted. In this case, the wiring 31 is drawn to the base 10 and the second arm 12 via the inside of the first arm 11. In addition, the robot 1 is a floor-standing type SCARA robot in which the base 10 is fixed to the floor or the like in the embodiment described above, but may be a ceiling-hanging type SCARA robot in which the base 10 is hung from a ceiling. In this case, the base 10 is hung from, for example, a top plate positioned above a frame-shaped leg portion of a stand.

The invention claimed is:

1. A robot comprising:

a base;

a first arm that is joined to the base and that rotates around a first rotation axis with respect to the base;

a second arm that is joined to the first arm and that rotates around a second rotation axis, which is parallel to the first rotation axis, with respect to the first arm;

a work head that includes a spline shaft which is disposed at the second arm and which is disposed along a third rotation axis parallel to the first rotation axis and a spline nut which is mounted on the spline shaft, and in which the spline shaft rotates around the third rotation axis when the spline nut is rotated; and a spline shaft first drive mechanism that rotates the spline nut to rotate the spline shaft around the third rotation axis, wherein the spline shaft first drive mechanism includes a motor and a power transmission mechanism that transmits rotation of the motor to the spline nut, the power transmission mechanism has a first pulley that is fixed to a rotation shaft of the motor, a second pulley that is fixed to the spline nut, an intermediate pulley that is supported by a support member via a bearing and that rotates around a fourth rotation axis, which is parallel to the first rotation axis, with respect to the second arm, a first belt that is wound around the first pulley and the intermediate pulley, and a second belt that is wound around the intermediate pulley and the second pulley, the intermediate pulley has a first intermediate pulley around which the first belt is wound, a second intermediate pulley that is disposed side by side with the first intermediate pulley in a direction along the fourth rotation axis and around which the second belt is wound, and a shaft portion that is disposed along the fourth rotation axis and that couples the first intermediate pulley and the second intermediate pulley, and is supported by the support member via the bearing at the shaft portion, one of the first intermediate pulley and the second intermediate pulley has a recess portion that is open to another side and into which the shaft portion is inserted, at least a part of the bearing is positioned in the recess portion, and in plan view from a direction orthogonal to the fourth rotation axis, the bearing and the first belt or the second belt overlap each other.

2. The robot according to claim 1, wherein the first intermediate pulley has a diameter larger than a diameter of the second intermediate pulley, the first intermediate pulley has the recess portion, and in plan view from the direction orthogonal to the fourth rotation axis, the bearing and the first belt overlap each other.

3. The robot according to claim 2, wherein the bearing includes a first bearing that is disposed along the fourth rotation axis and that is positioned closest to a first intermediate pulley side and a second bearing that is disposed along the fourth rotation axis and that is positioned closest to a second intermediate pulley side, and the first bearing is entirely positioned in the recess portion.

4. The robot according to claim 3, wherein a surface of the first bearing on the first intermediate pulley side is in contact with the first intermediate pulley.

5. The robot according to claim 4, wherein the first bearing and the second bearing are in contact with each other.

6. The robot according to claim 3, wherein the support member has a fixing plate that is positioned between the first intermediate pulley and the second intermediate pulley in plan view from the direction orthogonal to the fourth rotation axis and that is fixed to the second arm, and the second bearing overlaps the fixing plate in plan view from the direction orthogonal to the fourth rotation axis.

7. The robot according to claim 6, wherein the support member has a tubular bearing holding portion that is inserted into the recess portion, and the shaft portion is inserted through the bearing holding portion, and the bearing is disposed between an outer peripheral surface of the shaft portion and an inner peripheral surface of the bearing holding portion.

8. The robot according to claim 7, wherein a surface of the second bearing on the second intermediate pulley side is flush with a surface of the bearing holding portion on the second intermediate pulley side.

9. The robot according to claim 1, wherein the first intermediate pulley has a diameter larger than a diameter of the second intermediate pulley, the first intermediate pulley has the recess portion, in plan view from the direction orthogonal to the fourth rotation axis, the bearing and the first belt overlap each other, the support member has a fixing plate that is positioned between the first intermediate pulley and the second intermediate pulley in plan view from the direction orthogonal to the fourth rotation axis and that is fixed to the second arm and a tubular bearing holding portion that protrudes from the fixing plate to a first intermediate pulley side and that is inserted into the recess portion, the shaft portion is inserted through the bearing holding portion, and the bearing is disposed between an outer peripheral surface of the shaft portion and an inner peripheral surface of the bearing holding portion, the bearing includes a first bearing that is disposed along the fourth rotation axis and that is positioned closest to the first intermediate pulley side and a second bearing that is disposed along the fourth rotation axis and that is positioned closest to a second intermediate pulley side, the first bearing is entirely positioned in the recess portion and has a surface on the first intermediate pulley side that comes into contact with the first intermediate pulley, the second bearing overlaps the fixing plate in plan view from the direction orthogonal to the fourth rotation axis, and a surface of the second bearing on the second intermediate pulley side is flush with a surface of the bearing holding portion on the second intermediate pulley side and is in contact with a head of a screw tightened to the surface of the bearing holding portion on the second intermediate pulley side.

10. A robot system comprising:

a robot; and a control device that controls driving of the robot, wherein the robot includes a base, a first arm that is joined to the base and that rotates around a first rotation axis with respect to the base, a second arm that is joined to the first arm and that rotates around a second rotation axis, which is parallel to the first rotation axis, with respect to the first arm, a work head that includes a spline shaft which is disposed at the second arm and which is disposed along a third rotation axis parallel to the first rotation axis and a spline nut which is mounted on the spline shaft, and in which the spline shaft rotates around the third rotation axis when the spline nut is rotated, and a spline shaft first drive mechanism that rotates the spline nut to rotate the spline shaft around the third rotation axis, the spline shaft first drive mechanism includes a motor and a power transmission mechanism that transmits rotation of the motor to the spline nut, the power transmission mechanism has a first pulley that is fixed to a rotation shaft of the motor, a second pulley that is fixed to the spline nut, an intermediate pulley that is supported by a support member via a bearing and that rotates around a fourth rotation axis, which is parallel to the first rotation axis, with respect to the second arm, a first belt that is wound around the first pulley and the intermediate pulley, and a second belt that is wound around the intermediate pulley and the second pulley, the intermediate pulley has a first intermediate pulley around which the first belt is wound, a second intermediate pulley that is disposed side by side with the first intermediate pulley in a direction along the fourth rotation axis and around which the second belt is wound, and a shaft portion that is disposed along the fourth rotation axis and that couples the first intermediate pulley and the second intermediate pulley, and is supported by the support member via the bearing at the shaft portion, one of the first intermediate pulley and the second intermediate pulley has a recess portion that is open to another side and into which the shaft portion is inserted, at least a part of the bearing is positioned in the recess portion, and in plan view from a direction orthogonal to the fourth rotation axis, the bearing and the first belt or the second belt overlap each other.

* * * * *